United States Patent
Cloud (10) Patent No.: US 10,400,813 B2
(45) Date of Patent: Sep. 3, 2019

(54) HYBRID FASTENER

(71) Applicant: BOARD OF TRUSTEES OF MICHIGAN STATE UNIVERSITY, East Lansing, MI (US)

(72) Inventor: Gary L. Cloud, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 218 days.

(21) Appl. No.: 15/258,413

(22) Filed: Sep. 7, 2016

(65) Prior Publication Data

US 2016/0377108 A1    Dec. 29, 2016

Related U.S. Application Data

(62) Division of application No. 13/910,266, filed on Jun. 5, 2013, now Pat. No. 9,464,658.

(60) Provisional application No. 61/658,163, filed on Jun. 11, 2012.

(51) Int. Cl.
| | |
|---|---|
| F16B 3/00 | (2006.01) |
| F16B 39/22 | (2006.01) |
| F16B 25/10 | (2006.01) |
| F16B 33/00 | (2006.01) |
| F16B 5/02 | (2006.01) |
| F16B 11/00 | (2006.01) |
| F16B 19/00 | (2006.01) |
| F16B 25/00 | (2006.01) |

(52) U.S. Cl.
CPC ............ *F16B 39/225* (2013.01); *F16B 3/005* (2013.01); *F16B 5/02* (2013.01); *F16B 11/006* (2013.01); *F16B 19/008* (2013.01); *F16B 25/0015* (2013.01); *F16B 25/106* (2013.01); *F16B 33/002* (2013.01); *F16B 33/004* (2013.01)

(58) Field of Classification Search
CPC ........................................................ F16B 3/005
USPC .................................................. 411/82, 82.1
See application file for complete search history.

(56) References Cited

U.S. PATENT DOCUMENTS

| | | | |
|---|---|---|---|
| 1,969,029 A | 8/1934 | Ostertag | |
| 3,472,301 A | 10/1969 | Pearce | |
| 3,613,495 A | * 10/1971 | Podgursky | ............ B29C 65/601 29/509 |
| 3,772,957 A | 11/1973 | Newton | |
| 4,094,222 A | 6/1978 | Lang et al. | |
| 4,100,954 A | 7/1978 | Muller et al. | |
| 4,113,398 A | 9/1978 | Jordan | |

(Continued)

FOREIGN PATENT DOCUMENTS

DE    35 45 849 A1 *    7/1987

OTHER PUBLICATIONS

Eager Polymers, M5 Cab-o-Sil Thickening Agent for Fluids available at http://www.eagerplastics.com/cab.htm (2006).

(Continued)

*Primary Examiner* — Flemming Saether
(74) *Attorney, Agent, or Firm* — Harness, Dickey & Pierce, PLC (57) ABSTRACT

A hybrid fastener is provided in combination with a structural insert. The insert is disposed about a shank of the fastener at an unthreaded section. In another aspect, a sleeve surrounds the shank of the fastener and has apertures for receiving the insert therethrough. Methods of using the above-described hybrid fastener for securing workpieces are also disclosed.

33 Claims, 8 Drawing Sheets

(56) References Cited

U.S. PATENT DOCUMENTS

| | | | |
|---|---|---|---|
| 4,114,654 | A | 9/1978 | Richardson |
| 4,224,971 | A | 9/1980 | Muller et al. |
| 4,263,832 | A | 4/1981 | Lang et al. |
| 4,280,391 | A | 7/1981 | Fischer et al. |
| 4,303,354 | A | 12/1981 | McDowell, Jr. |
| 4,355,933 | A | 10/1982 | Fischer |
| 4,370,372 | A | 1/1983 | Higgins et al. |
| 4,659,268 | A | 4/1987 | Del Mundo et al. |
| 4,690,365 | A | 9/1987 | Miller et al. |
| 4,776,738 | A | 10/1988 | Winston |
| 4,784,530 | A | 11/1988 | Price, Jr. |
| 4,860,513 | A | 8/1989 | Whitman |
| 4,922,573 | A | 5/1990 | Miller et al. |
| 4,945,625 | A | 8/1990 | Winston |
| 4,983,083 | A * | 1/1991 | Froehlich ............ F16B 13/141 411/107 |
| 4,990,041 | A | 2/1991 | Winston |
| 5,104,266 | A | 4/1992 | Daryoush et al. |
| 5,249,899 | A | 10/1993 | Wilson |
| 5,255,647 | A | 10/1993 | Kiczek |
| 5,670,183 | A * | 9/1997 | Weihs ................ B29C 65/54 264/262 |
| 5,747,560 | A * | 5/1998 | Christiani ............ C08K 9/04 523/209 |
| 6,393,795 | B1 | 5/2002 | Irwin et al. |
| 6,457,910 | B1 | 10/2002 | Ludwig et al. |
| 6,527,984 | B1 | 3/2003 | Ishimatsu |
| 6,588,999 | B2 | 7/2003 | Kubler et al. |
| 6,604,899 | B2 | 8/2003 | Kubler et al. |
| 6,686,407 | B2 * | 2/2004 | Robello ............... B82Y 30/00 524/445 |
| 6,732,420 | B2 | 5/2004 | Wang et al. |
| 6,896,462 | B2 | 5/2005 | Stevenson et al. |
| 6,902,366 | B2 | 6/2005 | Ducker, III et al. |
| 6,905,295 | B2 | 6/2005 | Stevenson et al. |
| 7,017,255 | B2 | 3/2006 | Wang et al. |
| 7,048,486 | B2 | 5/2006 | Schaty |
| 7,182,561 | B2 | 2/2007 | Jones |
| 8,079,794 | B2 | 12/2011 | Schael et al. |
| 8,087,149 | B2 | 1/2012 | Wang et al. |
| 8,250,728 | B2 | 8/2012 | Stevenson et al. |
| 9,068,583 | B2 | 6/2015 | Bray et al. |
| 9,464,658 | B2 * | 10/2016 | Cloud ................. F16B 39/225 |
| 2004/0109738 | A1 | 6/2004 | Ducker et al. |
| 2004/0197508 | A1 * | 10/2004 | Zoellner ............ B29C 37/0085 428/36.9 |
| 2005/0089384 | A1 | 4/2005 | Pratt |
| 2005/0205730 | A1 | 9/2005 | Carnevali |
| 2005/0244244 | A1 | 11/2005 | Ayrle |
| 2006/0283989 | A1 | 12/2006 | Lytle |
| 2007/0216067 | A1 * | 9/2007 | Bahr ................. B29C 67/246 264/328.1 |
| 2008/0317961 | A1 * | 12/2008 | Kozuka ................ B82Y 30/00 427/385.5 |
| 2010/0115882 | A1 | 5/2010 | Seroiszka et al. |
| 2011/0245378 | A1 | 10/2011 | Russ et al. |
| 2017/0284449 | A1 * | 10/2017 | Greegor ................ B64C 1/12 |

OTHER PUBLICATIONS

Herrera-Franco, Pedro J., et al., "Strain-Relief Inserts for Composites Fasteners," Proc. American Society for Metals—Eng. Soc. Detroit Advanced Coposites Conference, Dec. 1985, pp. 49-57.

Cloud, Gary, et al., "Some Strategies to Reduce Stress Concentrations at Bolted Joints in FGRP," Proc. 1989 Spring Conference on Experimental Mechanics, May 1989, pp. 727-733.

Cloud, G. L., et al., "Reduction of Stress Concentrations at Bolted Joints in FGRP," Proc. American Soc. for Composites 5th Technical Conference, Jun. 1990, pp. 71-80.

Herrera-Franco, Pedro J., et al., "Strain-Relief Inserts for Composite Fasteners—An Experimental Study," Journal of Composite Materials, vol. 26, No. 5, 1992, pp. 751-768.

Cloud, Gary L., "Developments in Experimental Mechanics with Applications Practical and Uncommon," IX Symposium on Mechanical Egineering, taken from Invited Plenary Lecture "Optical Methods in Experimental Mechanics: Fashion, Practicality, and Uncommon Applications" at Instituto Technologico de Merida, Oct. 1995, 24 pages.

Cloud, Gary, et al., "Some Approaches to Improve Efficiencies of Bolted Joints in Composites," Proc. 11th Advanced Composites Conference, Nov. 1995, pp. 121-132.

Cloud, Gary L., "Composite Joining," Presentation to Northrop-Grumman Aerospace, Jun. 14, 2009, 26 pages.

"Assembly How-To Guide 2010," brochure, www.assemblymag.com, Mar. 2010, 4 pages.

Bouchard, Brandon, et al., "Novel Insert Design for Thick Single Lap Bolted Composite Joints," Proceedings of the SEM Annual Conference, Jun. 7-10, 2010, 8 pages.

\* cited by examiner

HYBRID FASTENER

CROSS-REFERENCE TO RELATED APPLICATIONS

This application is a divisional application of U.S. Ser. No. 13/910,266, filed on Jun. 5, 2013; which claims the benefit of U.S. Provisional Application No. 61/658,163, filed on Jun. 11, 2012, both of which are incorporated by reference herein.

BACKGROUND AND SUMMARY

The present invention generally pertains to fasteners and more particularly to a hybrid fastener having an insert between the fastener and a workpiece being joined.

It is known to use a fastener to secure a plurality of workpieces. It is also known to employ a ferrule around a shank of the fastener or an adhesive material to the threads of a fastener to strengthen the joint and/or to further secure the fastener to the workpieces. Examples of such traditional devices are disclosed in U.S. Pat. No. 3,472,301 entitled "Self-Sealing Mechanical Fastener;" U.S. Pat. Nos. 4,094, 222 and 4,263,832 both entitled "Adhesively Secured Anchor Bolt;" U.S. Pat. Nos. 4,776,738 and 4,990,041 both entitled "Fastening Device;" and U.S. Pat. No. 5,249,899 entitled "Head Bolt and Driver Therefor;" all of which are incorporated by reference herein. Prior disclosed ferrules require precision machining and/or a large inventory of products to accommodate different fastener sizing, while prior adhesive materials are merely thin coatings along the threads of a fastener that provide no additional structure, cannot guarantee a filled gap, and have little to no stress-reducing properties. Furthermore, either design requires workpieces that are carefully machined, matched, and aligned.

In accordance with the present invention, an apparatus is provided having a fastener and a structural insert. In another aspect, the fastener includes a head and a shank. A further aspect provides at least one thread helically located about a shank. In still another aspect, an insert is disposed about a shank at an unthreaded section and extends at least partially into a head and/or the shank. In another aspect, a sleeve surrounds a shank of the fastener and has apertures extending therethrough. Yet another aspect provides a magnetically, electrically, or chemically attractive coating on the shank for attracting friable or elastomeric particles in a structural insert. In another aspect, electrically conductive particles are contained in the insert to accelerate curing by application of an electric field. In another aspect, the fastener is a self-drilling and self-tapping fastener. In another aspect, the fastener is a rivet. Methods of using the above-described hybrid fastener for securing workpieces are also disclosed.

The present hybrid fastener is advantageous over prior fastening members. For example, the present apparatus and method advantageously alleviate stress concentrations and contact stresses in workpieces being joined. Notably, the present hybrid fastener also works to seal edges of the apertures in the workpieces so as to preclude invasion by moisture or dirt. Moreover, the present apparatus effectively reduces costs by allowing increased tolerances for the workpiece apertures. Additional advantages and features of the present invention will be found in the following description and accompanying claims, as well as in the appended drawings.

BRIEF DESCRIPTION OF THE DRAWINGS

Corresponding reference numerals indicate corresponding parts throughout the several views of the drawings.

DETAILED DESCRIPTION

Multiple embodiments of a hybrid fastener 10 for joining a first workpiece 12 to a second workpiece 14 are illustrated and described with respect to FIGS. 1 through 25. Hybrid fastener 10, as described herein, allows for increased tolerances for apertures 16, 18 in workpieces 12, 14, respectively, while still sealing edges of the apertures 16, 18, and alleviating stress concentrations and contact stresses in the workpieces 12, 14 being joined. Workpieces 12, 14 may be brittle components that are negatively impacted by high stress concentrations (e.g., composite materials used for aircraft components). Accordingly, reduction in these stress concentrations and contact stresses are particularly important for these types of materials.

Figures 1, 2, 3:
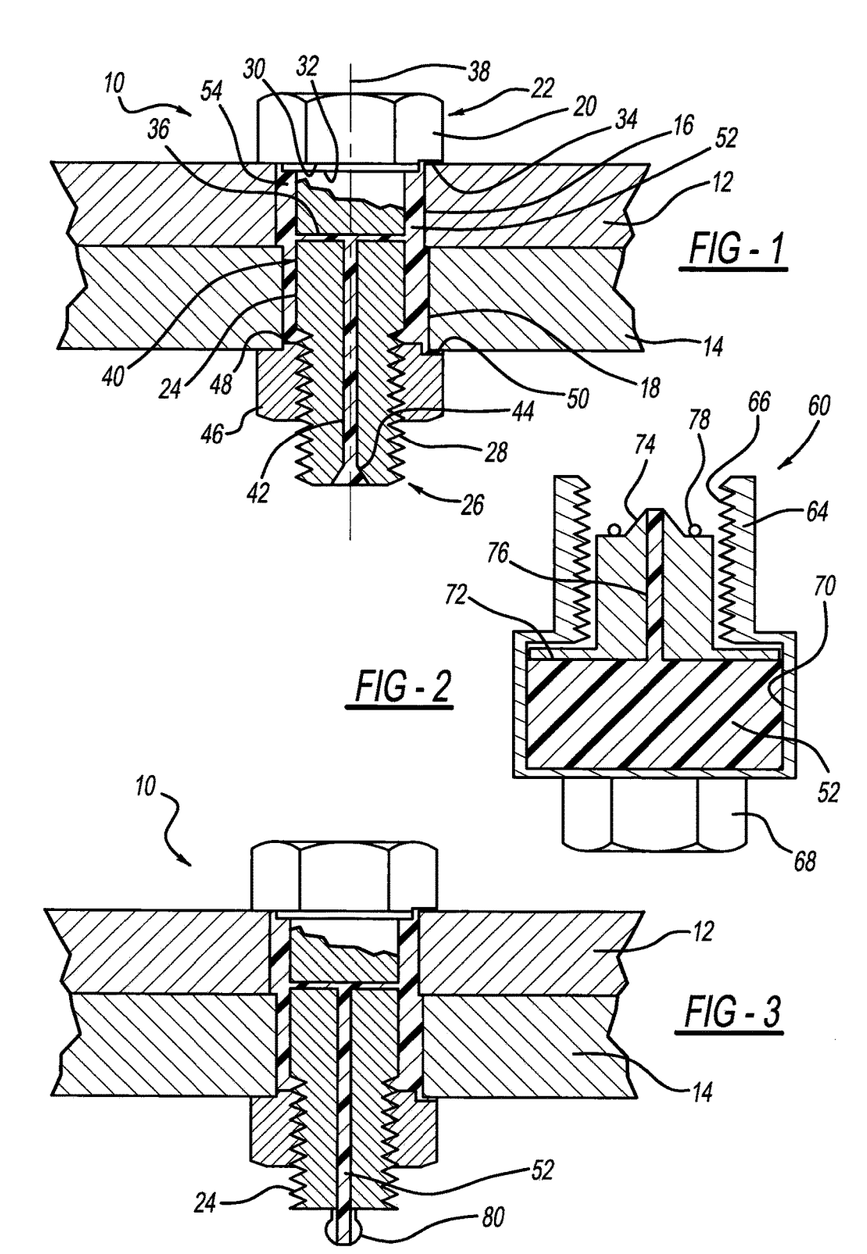
FIG. 1 is a partially fragmented, side view of workpieces joined by a hybrid fastener according to the present invention.
FIG. 2 is a partially fragmented, side view of a tool for injecting insert material into the fastener of FIG. 1.
FIG. 3 is a partially fragmented, side view of an alternate configuration to the tool of FIG. 2.

With reference now to FIG. 1, hybrid fastener 10 includes a head 20 disposed at a first end 22, a shank 24 extending from head 20 between first end 22 and a second end 26, and a helical thread 28 extending about shank 24 adjacent second end 26 and extending towards first end 22. An underside 30 of head 20 includes an integrally formed spacer 32 for centering fastener 10 within apertures 16, 18 of workpieces 12, 14. Alternately, spacer 32 may be a secondary part assembled before fastener 10 is inserted into workpieces 12, 14 (e.g., a washer). At least one slot 34 extends from spacer 32 to an outer diameter of head 20 along underside 30 of head 20. Shank 24 includes a channel 36 extending transversely to a longitudinal axis 38 of fastener 10 through the outer diameter of shank 24 so as to be in communication with a non-threaded portion 40 of shank 24. A duct 42 extends from a flared portion 44 at second end 26 and along longitudinal axis 38 until terminating at channel 36. Channel 36 and duct 42 may be produced by any of several different machining processes including, for example, drilling, electrical discharge machining, laser cutting or water-jet cutting. Furthermore, although channel 36 is shown extending fully through the diameter of shank 24 so as to be in a T-shaped configuration with duct 42, it is contemplated that channel 36 may only extend partially through shank 42 so as to be in an L-shaped configuration with duct 42.

Fastener 10 is arranged in workpieces 12, 14 by inserting shank 24 into apertures 16, 18 so as to protrude from workpieces 12, 14 by a distance such that a majority of shank 24 arranged within workpieces 12, 14 is devoid of helical thread 28. Fastener 10 is secured with a nut 46 over the extending portion of shank 24 for joining first and second workpieces 12, 14, as shown. Similarly to fastener 10, nut 46 also includes a spacer 48 and at least one slot 50 extending from spacer 48 to an outer diameter of nut 46. An at least partially liquefied structural insert material 52 is injected through duct 42 at flared portion 44 so as to fill duct 42 and channel 36, as will be described in more detail below. Insert material 52 is injected completely through duct 42 and channel 36 so as to be disposed about shank 24 at non-threaded portion 40 adjacent first end 22 of fastener 10 within a void area 54 defined between workpieces 12, 14 and shank 24 and between head 20 and nut 46. Void area 54 may be sized appropriately for each application; however, one exemplary void area 54 may provide an insert thickness of at least 2 mm. To assure complete fill of void area 54, slot 34 in head 20 and slot 50 in nut 46 are designed to allow trapped air to escape. Further, complete filling of void area 54 is signaled when a small amount of insert material 52 is extruded from slots 34, 50.

Insert material 52 hardens after injection so as to remain in void area 54 and at least partially in channel 36 and duct 42. In this way, insert material 52 serves to add strength and/or stiffness to the workpiece/fastener joint by eliminating clearance between shank 24 and surrounding apertures 16, 18. Insert material 52 may also reduce or control stress concentrations caused by tilting of fastener 10, as well as contact of asperities between contacting surfaces, for example, by redistributing the bearing contact stresses between fastener 10 and workpieces 12, 14. This may be achieved by varying thickness or composition of insert material 52.

The composition of insert material 52 is selected so as to tailor the material properties to the application. Insert material 52 may be a matrix or carrier material having an additive material suspended therein. The additive material may be a solid particulate or fiber that contributes to the desired properties of the joint. For example, for a joint that is subject to impact loads and propagation of stress waves through the bolted joint, insert materials that create an impedance mismatch between the joint components can be chosen in order to attenuate the stress waves. In other cases, maximum stiffness and/or strength is sought. In some applications, such as when vibrational loads are expected, a balance between strength and compliance must be achieved. Certain electrical, magnetic, and chemical properties can also be controlled by choice of material components.

The matrix or carrier material may be, for example, a thermosetting resin (e.g., toughened epoxy hybrids, epoxy nylon, epoxy phenolic, polyurethane, phenolic, polyester resin) or a thermoplastic resin (e.g., polyamide, polyester (saturated), nylon, polystyrene, polyethylene). The additive material(s) may be graphene nanoparticles (e.g., foliated graphite nanoplatelets having a particle size range of 0.3 to 100 nanometers thickness by 0.3 to 10 micrometers length, with a preferred size of 5 micrometers), silica (nanosilica) particles (e.g., amorphous silicon dioxide having a size range of 200 to 500 nanometers), graphene coated with an elastomer, nylon particles, chopped graphite fibers, chopped glass fibers, aluminum particles, steel or iron particles, elastomeric (including neoprene) particles, aluminum oxide particles, ceramics (e.g., silicon carbide), and/or chopped cellulose fibers.

In addition, a magnetically, electrically, or chemically attractive material may be coated on shank 24 and/or on inner surfaces of apertures 16, 18 of the workpieces 12, 14 before arranging fastener 10 in workpieces 12, 14 so as to attract friable or elastomeric particles in structural insert material 52. In this way, migration of an additive friable or elastomeric particle causes a predefined weakened zone for insert 52 to assist in removal of fastener 10. Furthermore, an electroconductive material may be incorporated into insert material 52, itself, such that application of an electrical or magnetic field will induce heating and accelerate curing of insert material 52. Alternately or in addition, a release agent may be applied to shank 24 and/or to inner surfaces of apertures 16, 18 of workpieces 12, 14 to assist in removal of fastener 10 and/or insert material 52.

With reference to FIG. 2, a tool 60 for injecting insert material 52 into fastener 10 is described as having a main body 64, an internal thread 66, an integral nut-shaped boss 68, and an inner cavity 70 defining a reservoir for both insert material 52 and a piston 72. Thread 66 is used to secure tool 60 onto shank 24 of fastener 10 at second end 26, such that a nose 74 of piston 72 engages and seals against flared portion 44 of duct 42. As tool 60 advances further along the threads of shank 24, piston 72 is forced downwardly into cavity 70 where it compresses insert material 52. Notably, as piston 72 engages shank 24 it ceases rotational movement. However, body 64 continues rotating, which assists in agitating and mixing insert material 52. This compression of insert material 52 forces its upward movement through a central opening 76 in piston 72 and into duct 42 of fastener 10. Optionally, a gasket or O-ring 78 may be added to the interface between piston 72 and fastener 10 to assist in preventing leakage of insert material 52 during injection.

Although not shown, tool 60 may also be applicable to two-part material systems. In such a case, tool 60 may include separate compartments for housing material constituents before combination during insertion. Alternately, tool 60 may include piercing features for opening a capsule containing constituent material products. In any of these cases, tool 60 is designed as a single-use device (e.g., discardable materials) or reusable product.

Referring now to FIG. 3, an alternate tool 80 for injecting insert material 52 into fastener 10 is described as a snap-on grease fitting. Tool 80 is threaded into or machined integral with shank 24 for injecting insert material 52 with a lever or air pressure system (not shown). Tool 80 may resemble a zerk fitting; however, a spring-loaded check valve may or may not be used. Tool 80 allows an insert injection device (not shown), such as a grease gun, a calking gun, a syringe, or a resin-mixing applicator to be attached thereto, so that insert material 52 can be injected under pressure.

Figures 4, 5, 6:
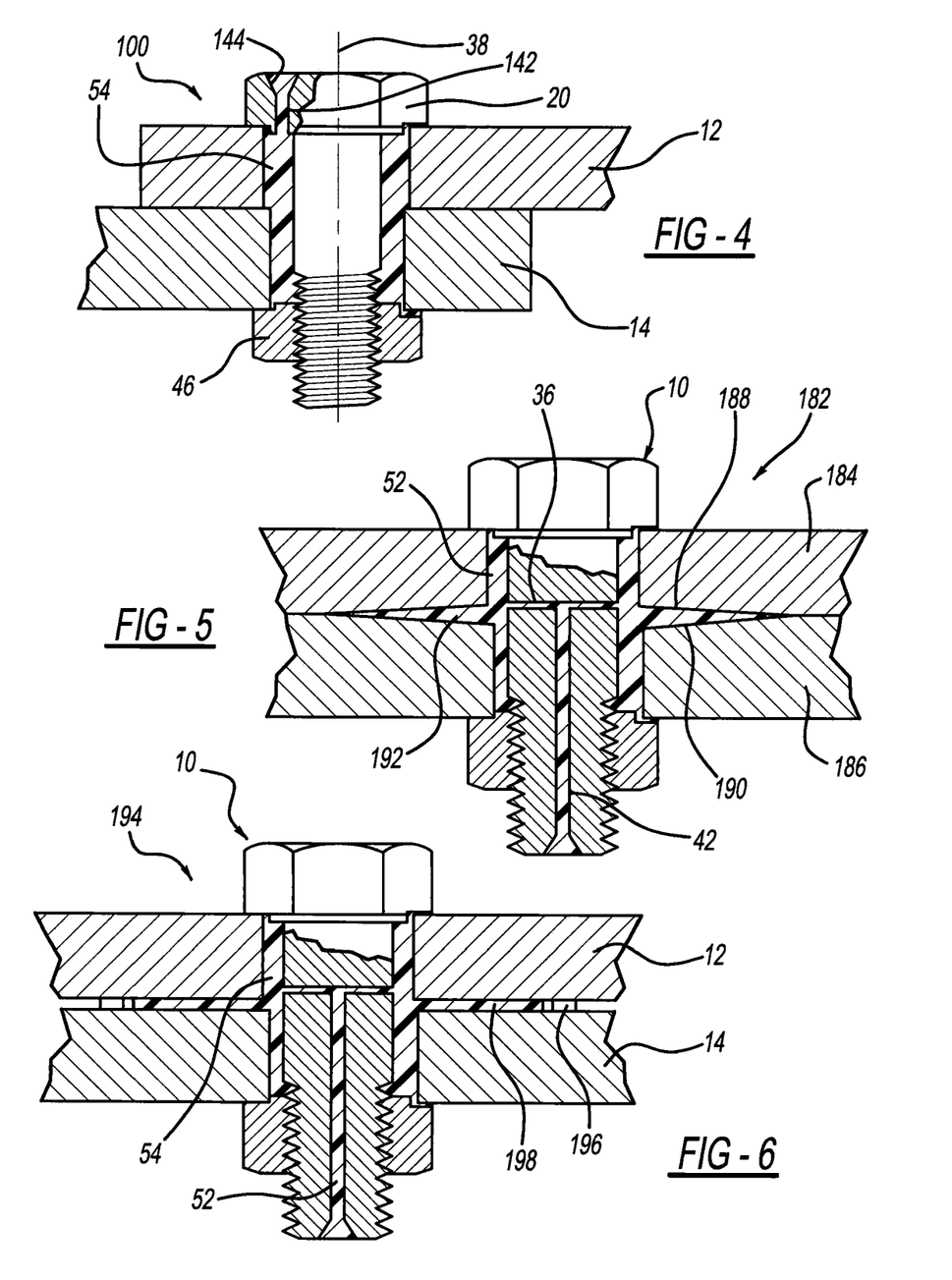
FIG. 4 is a partially fragmented, side view of an alternate configuration to the fastener of FIG. 1.
FIG. 5 is a partially fragmented, side view of an alternate configuration to the workpieces of FIG. 1.
FIG. 6 is a partially fragmented, side view of an alternate configuration to the workpieces of FIG. 1.

With reference now to FIG. 4, an alternate hybrid fastener 100 is described for joining workpieces 12, 14. Hybrid fastener 100 is constructed substantially similarly to hybrid fastener 10; however, hybrid fastener 100 omits both channel 36 and duct 42. Instead, hybrid fastener 100 includes a duct 142 extending downwardly through head 20 to void 54 from an injection port 144. Duct 142 is arranged parallel and offset from longitudinal axis 38. Although not shown, it should be understood that duct 142 and injection port 144 may also be arranged to extend through nut 46, instead of or in addition to head 20.

Referring now to FIG. 5, fastener 10 can alternately be used to create a hybrid joint 182 between workpieces 184, 186. Hybrid joint 182 combines mechanical joining with adhesive fastening in a single step without the need for additional equipment (e.g., clamps). In particular, edges of surfaces 188, 190 of the workpieces 184, 186 are tapered or scarfed so as to create a cavity 192 adjacent fastener 10. Insert material 52 is inserted into duct 42 and channel 36 as previously described. Insert material 52 extends from void 54 into cavity 192.

In an alternate hybrid joint configuration 194 shown in FIG. 6, workpieces 12, 14 are separated by a spacer 196. Material for spacer 196 is chosen to provide appropriate adhesive film thickness, and may be, for example, paper, cardboard, etc. Spacer 196 is arranged between workpieces 12, 14 for providing a gap between workpieces 12, 14. Fastener 10 is then inserted into workpieces 12, 14 and insert material 52 is injected therein, as previously described. Insert material 52 extends from void 54 into a cavity 198 defined by spacer 196 and workpieces 12, 14. Spacer 196 remains in between workpieces 12, 14 after installation.

While not shown, alternate hybrid joint configurations are also contemplated. For example, workpieces 12, 14 may each have a shallow counterbore formed at mating surfaces adjacent apertures 16, 18. Furthermore, while only one spacer is shown in FIG. 6, it is contemplated that multiple spacers may also be used to separate workpieces 12, 14. In these alternate hybrid joint configurations, it may not be necessary to include a channel for air bleed to assure filling of the void 54 and/or cavity 192, 198 as workpiece roughness will provide passages for air escapement.

Figures 7, 8, 9:
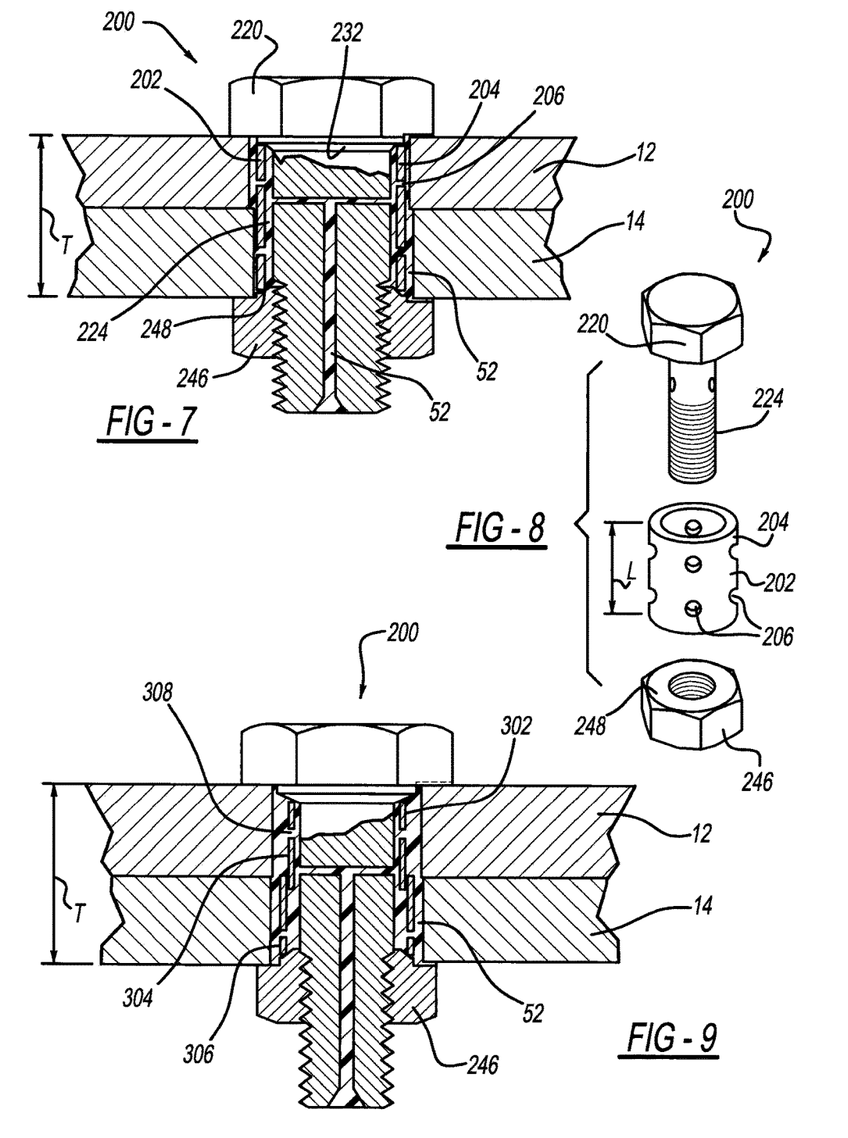
FIG. 7 is a partially fragmented, side view of an alternate configuration to the fastener of FIG. 1 including a sleeve member.
FIG. 8 is an exploded view of the fastener and sleeve member of FIG. 7.
FIG. 9 is a partially fragmented, side view of an alternate configuration to the fastener of FIG. 1 including a telescoping sleeve member.

With reference now to FIGS. 7 and 8, an alternate hybrid fastener 200 is described for joining workpieces 12, 14. Hybrid fastener 200 is constructed substantially similarly to hybrid fastener 10; however, hybrid fastener 200 incorporates a collar or sleeve 202 surrounding a shank 224 of fastener 200. Sleeve 202 is a thin-walled, circular cylinder 204 having a plurality of spaced apart apertures 206 (preferably at least 6 apertures) for allowing insert material 52 to pass therethrough. Sleeve 202 may be manufactured as a hollow cylinder of a metallic material, such as a steel or an aluminum alloy, or of a polymer, such as nylon or phenolic. Sleeve 202 has a length L that is slightly less than the combined thickness T of workpieces 12, 14. Furthermore, centering spacers 232, 248 on head 220 and nut 246 are shaped to center sleeve 202 along and about shank 224. As installation of fastener 200 is similar to that described for fastener 10, a detailed description is foregone. However, sleeve 202 is arranged about shank 224 before insertion of fastener 200 into workpieces 12, 14. Insert material 52 passes through apertures 206 so as to integrally incorporate sleeve 202 after hardening. In this way, insert material 52 preferably encapsulates all sides of sleeve 202 when in the fully installed condition.

Figures 10, 11, 12, 13:
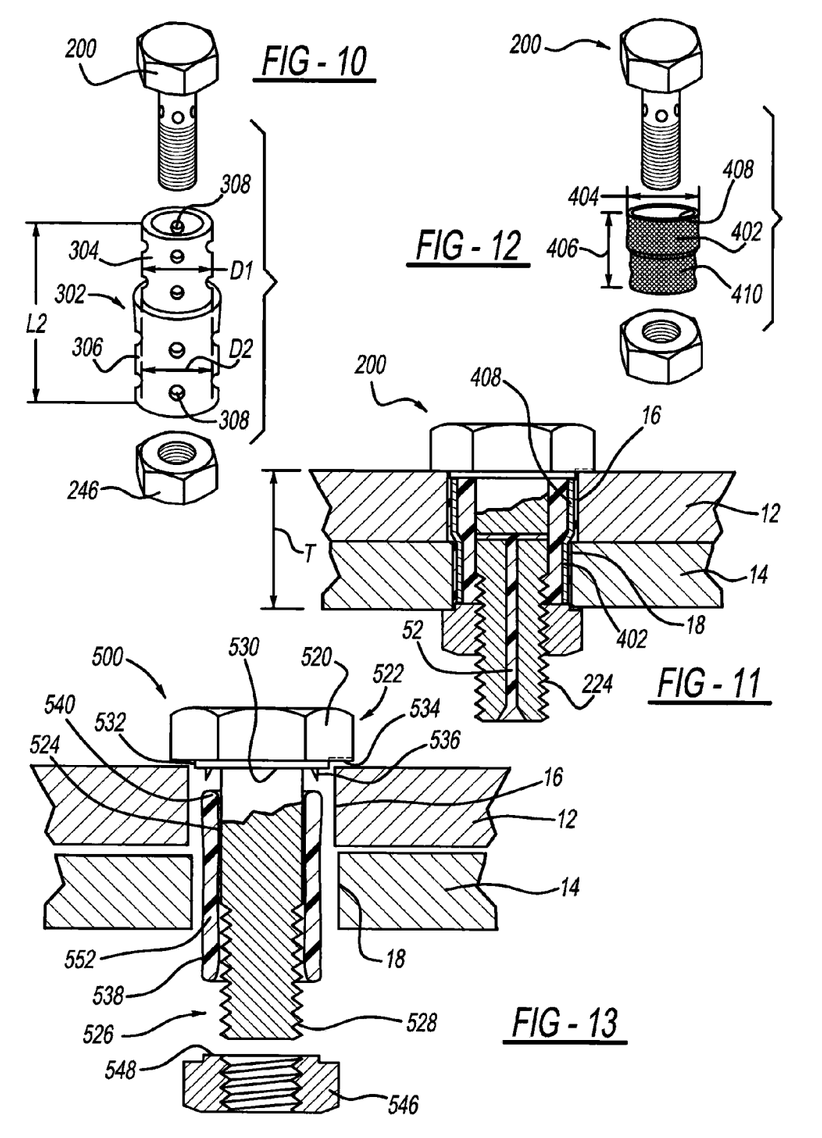
FIG. 10 is an exploded view of the fastener and telescoping sleeve member of FIG. 9.
FIG. 11 is a partially fragmented, side view of an alternate configuration to the fastener of FIG. 1 including a mesh sleeve member.
FIG. 12 is an exploded view of the fastener and mesh sleeve member of FIG. 11.
FIG. 13 is a partially fragmented, side view of unassembled workpieces and a fastener having a capsule.

Referring now to FIGS. 9 and 10, an alternate sleeve 302 is described for use with hybrid fastener 200 in joining workpieces 12, 14. Sleeve 302 is a telescoping or self-adjusting sleeve having a first thin-walled hollow cylinder 304 with an outer diameter D1 and a second thin-walled hollow cylinder 306 with an inner diameter D2. Outer diameter D1 is slightly smaller than inner diameter D2, such that first cylinder 304 slides within second cylinder 306. Sleeve 302 is used in situations where thickness T of workpieces 12, 14 is unknown, such as in field assembly. In this way, the length of sleeve 302 is adjustable to a broad range of workpiece thicknesses during installation. Both cylinders 304, 306 include a plurality of apertures 308 for allowing insert material 52 to pass therethrough. In use, cylinder 304 is slipped into cylinder 306 so as to have a combined length L2 that is greater than thickness T of workpieces 12, 14. The tightening of nut 246 causes cylinders 304, 306 to telescope together to properly accommodate workpiece thickness T.

In an alternate embodiment shown in FIGS. 11 and 12, another alternate sleeve 402 is described for use with hybrid fastener 200 in joining workpieces 12, 14. Sleeve 402 is a woven or stitched tube of graphite fiber, glass fiber, or other fibrous reinforcing material, for resisting effects of shear stresses between and within workpieces 12, 14. Sleeve 402 is manufactured as a length of woven fiber cloth that is stitched into a substantially circular or cylindrically-shaped tube or, alternately, may be cut from a pre-woven tube of the desired fabric. An outer diameter 404 of sleeve 402 is less than the inner diameter of either aperture 16 of workpiece 12 or aperture 18 of workpiece 14. However, sleeve 402 must be thick enough to meet strength requirements for the joint, be capable of radial expansion during assembly, and be flexible enough to conform to apertures 16, 18. Sleeve 402 has a length 406 that is equal to or slightly greater than the combined thickness T of workpieces 12, 14. In use, sleeve 402 is arranged about shank 224 before insertion of fastener 200 into workpieces 12, 14. As insert material 52 is forced against an interior surface 408 of sleeve 402, it expands sleeve 402 so that it conforms closely to apertures 16, 18. At the same time, apertures 410 between threads of fabric of sleeve 402 become impregnated with insert material 52. Accordingly, as insert material 52 solidifies, sleeve 402 and insert material 52 form a tight-fitting monolithic structure between fastener 200 and workpieces 12, 14.

Figures 14, 15:
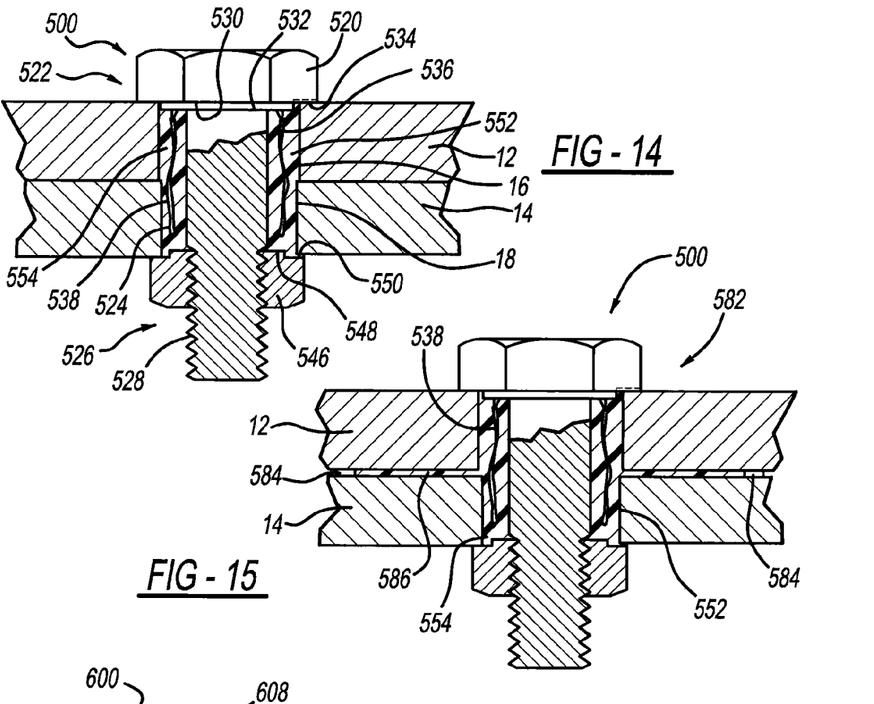
FIG. 14 is a partially fragmented, side view of the assembled workpieces and the fastener having the capsule of FIG. 13.
FIG. 15 is a partially fragmented, side view of an alternate configuration to the workpieces of FIG. 14.

Referring now to FIGS. 13 and 14, an alternate hybrid fastener 500 is described for joining workpieces 12, 14. Fastener 500 includes a head 520 disposed at a first end 522, a shank 524 extending from head 520 between first end 522 and a second end 526, and a helical thread 528 extending about shank 524 adjacent second end 526 and extending towards first end 522.

An underside 530 of head 520 includes an integrally formed spacer 532 for centering fastener 500 within apertures 16, 18 of workpieces 12, 14. Alternately, spacer 532 may be a secondary part assembled before fastener 500 is inserted into workpieces 12, 14 (e.g., a washer). At least one slot 534 extends from spacer 532 to an outer diameter of head 520 along underside 530 of head 520. Underside 530 of head 520 also includes a plurality of sharp projections 536 extending from spacer 532. A substantially toroidal capsule 538 containing an insert material 552 is arranged about shank 524. Alternately, capsule 538 may be a flat envelope or an assembly of hollow tubes (e.g., nanotubes) wrapped about shank 524. Capsule 538 is made of a material that will fragment, tear, or burst when sufficiently compressed and/or pressed against projections 536. As such, capsule 538 is sized to house enough insert material 552 to fill a void area 554 between shank 524 and apertures 16, 18 and yet be long enough to reach projections 536, as will be described in more detail below. When insert material 552 consists of two or more components (e.g., an epoxy), capsule 538 may be subdivided into two or more compartments.

Fastener 500 is arranged in workpieces 12, 14 by inserting shank 524 into apertures 16, 18 so as to protrude from workpieces 12, 14 by a distance such that a majority of shank 524 arranged within workpieces 12, 14 is devoid of devoid of helical thread 528. Fastener 500 is secured with a nut 546 over the extending portion of shank 524 for joining first and second workpieces 12, 14, as shown. Similarly to fastener 500, nut 546 also includes a spacer 548 and at least one slot 550 extending from spacer 548 to an outer diameter of nut 546. During installation and tightening of nut 546, projections 536 perforate capsule 538 and dislodge insert material 552 therefrom. Insert material 552 is injected completely into void area 554 so as to be disposed about shank 524 at a non-threaded portion 540 adjacent first end 522 of fastener 500. To assure complete fill of void area 554, slot 534 in head 520 and slot 550 in nut 546 are designed to allow trapped air to escape. Further, complete filling of void area 554 is signaled when a small amount of insert material 552 is extruded from slots 534, 550. Insert material 552 hardens after injection so as to remain in void area 554 and at least partially encompass capsule 538.

With reference now to FIG. 15, fastener 500 can alternately be used to create a hybrid joint 582 between workpieces 12, 14. Workpieces 12, 14 are separated by a spacer 584. Spacer 584 can be made of paper, cardboard, or a number of other materials, chosen to provide appropriate adhesive film thickness. Spacer 584 is arranged between workpieces 12, 14 for providing a gap between workpieces 12, 14. Fastener 500 is then inserted into workpieces 12, 14 and insert material 552 is rejected from capsule 538, as previously described. Insert material 552 extends from void 554 into a cavity 586 defined by spacer 584 and workpieces 12, 14 so as to form a patch of insert that will act as an adhesive between workpieces 12, 14. Spacer 584 remains between workpieces 12, 14 after installation. It should be noted that any of the aforementioned hybrid joints may be used in place of spacers 584 (e.g., scarfing workpieces, counterbores on workpieces, etc.).

Figure 16:
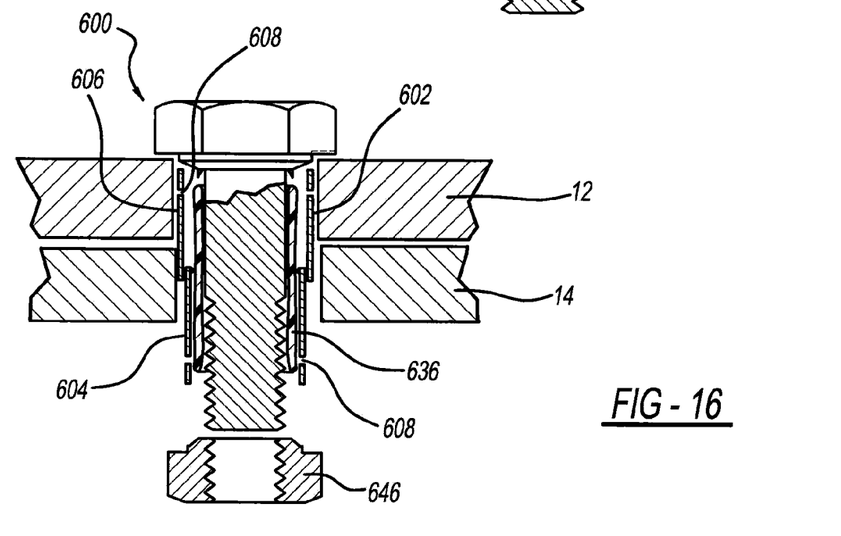
FIG. 16 is a partially fragmented, side view of an unassembled alternate configuration to the fastener of FIG. 14 including a telescoping sleeve member.
Figures 17, 18, 19:
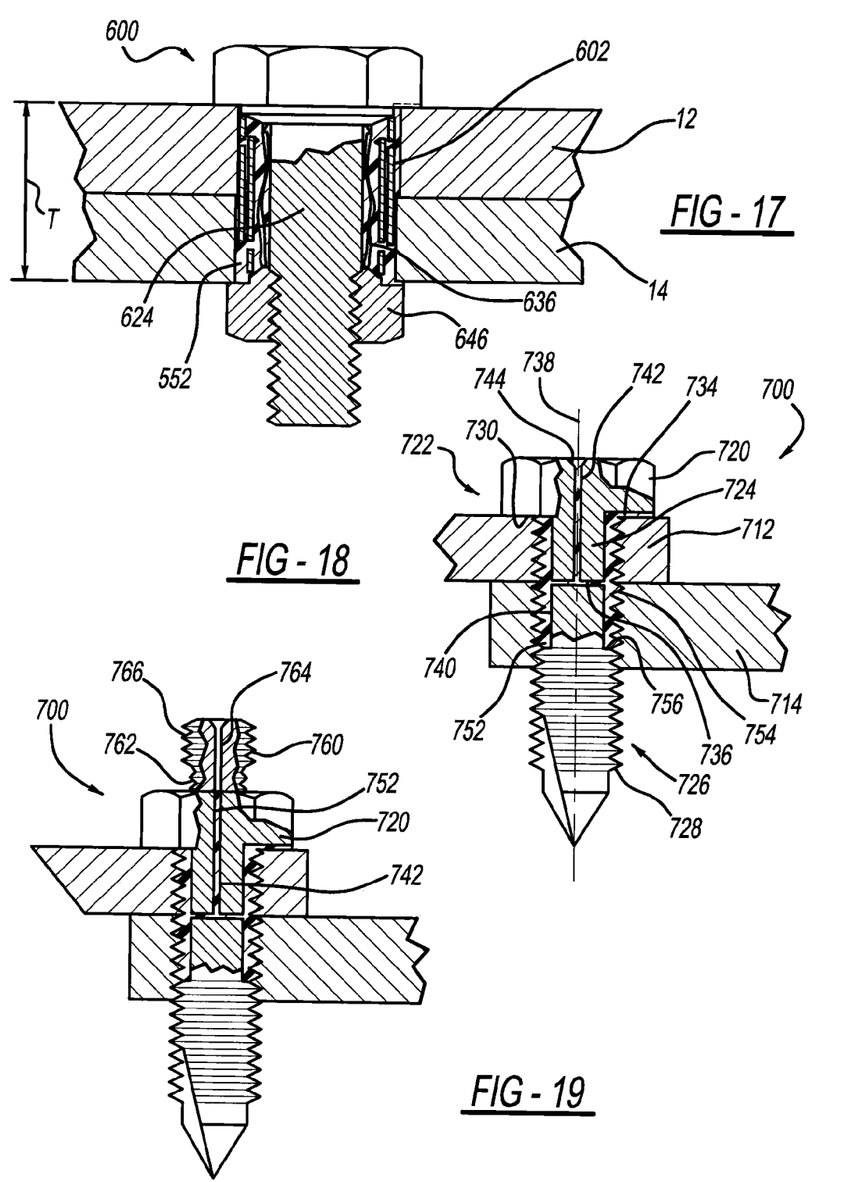
FIG. 17 is a partially fragmented, side view of an assembled alternate configuration to the fastener of FIG. 14 including a telescoping sleeve member.
FIG. 18 is a partially fragmented, side view of workpieces joined by a hybrid self-drilling fastener according to the present invention.
FIG. 19 is a partially fragmented, side view of an alternate configuration to the self-drilling fastener of FIG. 18.

Referring now to FIGS. 16 and 17, an alternate hybrid fastener 600 is described for joining workpieces 12, 14. Hybrid fastener 600 is constructed substantially similarly to hybrid fastener 500; however, hybrid fastener 600 incorporates a self-adjusting or telescoping sleeve 602 surrounding a capsule 636 about a shank 624 of fastener 600. Sleeve 602 has a first thin-walled hollow cylinder 604 and a second thin-walled hollow cylinder 606, with cylinder 604 being slightly smaller than cylinder 606 so that cylinder 604 slides within cylinder 606, as previously described. Both cylinders 604, 606 have a plurality of apertures 608 for allowing insert material 552 to pass therethrough. As installation of fastener 600 is similar to that described for fastener 500, a detailed description is foregone. However, sleeve 602 is arranged about capsule 636 before insertion of fastener 600 into workpieces 12, 14. Cylinder 604 is slipped into cylinder 606 so as to have a combined length that is greater than thickness T of workpieces 12, 14. The tightening of nut 646 causes cylinders 604, 606 to telescope together to properly accommodate workpiece thickness T. Insert material 552 passes through apertures 608 so as to integrally incorporate sleeve 602 after hardening. It should be understood that any of the aforementioned sleeves (e.g., single sleeve, fabric sleeve, etc.) may be used in place of sleeve 602. Notably, sleeve 602 may also incorporate a plurality of projections (not shown) to facilitate perforation and tearing of capsule 636.

With reference now to FIG. 18, a fastener 700 is substantially similar to that described with respect to fastener 10; however, fastener 700 is shown as a self-drilling/self-tapping fastener. Fastener 700 includes a head 720 disposed at a first end 722, a shank 724 extending from head 720 between first end 722 and a second end 726, and a fluted or drilling/tapping portion 728 extending about shank 724 adjacent second end 726 and extending towards first end 722. Notably, flute 728 has a minor thread diameter greater than the diameter of shank 724. An underside 730 of head 720 includes at least one slot 734 extending from shank 724 to an outer diameter of head 720. Shank 724 includes a channel 736 extending transversely to a longitudinal axis 738 of fastener 700 through the outer diameter of shank 724 so as to be in communication with a non-threaded portion 740 of shank 724. A duct 742 extends from a flared portion 744 at head 720 and along longitudinal axis 738 until terminating at channel 736. Channel 736 and duct 742 may be produced by any of several different machining processes including, for example, drilling, electrical discharge machining, laser cutting or water-jet cutting.

Fastener 700 is arranged in a plurality of workpieces 712, 714 by driving flute 728 so as to protrude from workpieces 712, 714 by a distance such that only a portion of second end 722 (e.g., portion of shank 724 having flute 728) is arranged within workpieces 712, 714. At an least partially liquefied structural insert material 752 is injected through duct 742 at flared portion 744 so as to fill duct 742 and channel 736, as previously described. Insert material 752 is injected completely through duct 742 and channel 736 so as to be disposed about shank 724 at non-threaded portion 740 adjacent first end 722 of fastener 700 within a void area 754 defined between workpieces 712, 714 and shank 724 and between head 720 and an uppermost thread 756 arranged within workpiece 714. To assure complete fill of void area 754, slot 734 in head 720 is designed to allow trapped air and excess insert material 752 to escape. Complete filling of void area 754 is signaled when a small amount of insert material 752 is extruded from slot 734. Notably, insert material 752 fills the threads that have been cut by flute 728 thereby reducing or eliminating stress concentrations present at the roots and tips of screw threads.

Fastener 700 also incorporates an adapter 760 for ease in inserting insert material 752, as shown in FIG. 19. Adapter 760 includes a narrow neck 762 that is threaded into or machined integral with head 720. Adapter 760 has a duct 764 in communication with duct 742 of head 720 for injecting insert material 752, such as with the aforementioned tool 60 or with a lever or air pressure system. As can be seen, the injecting device is secured to a threaded portion 766 of adapter 760 during injection. After creation of the joint, adapter 760 can remain attached to head 720 or can be removed (e.g., either by a hammer blow or nipped with cutting pliers).

Figures 20, 21, 22:
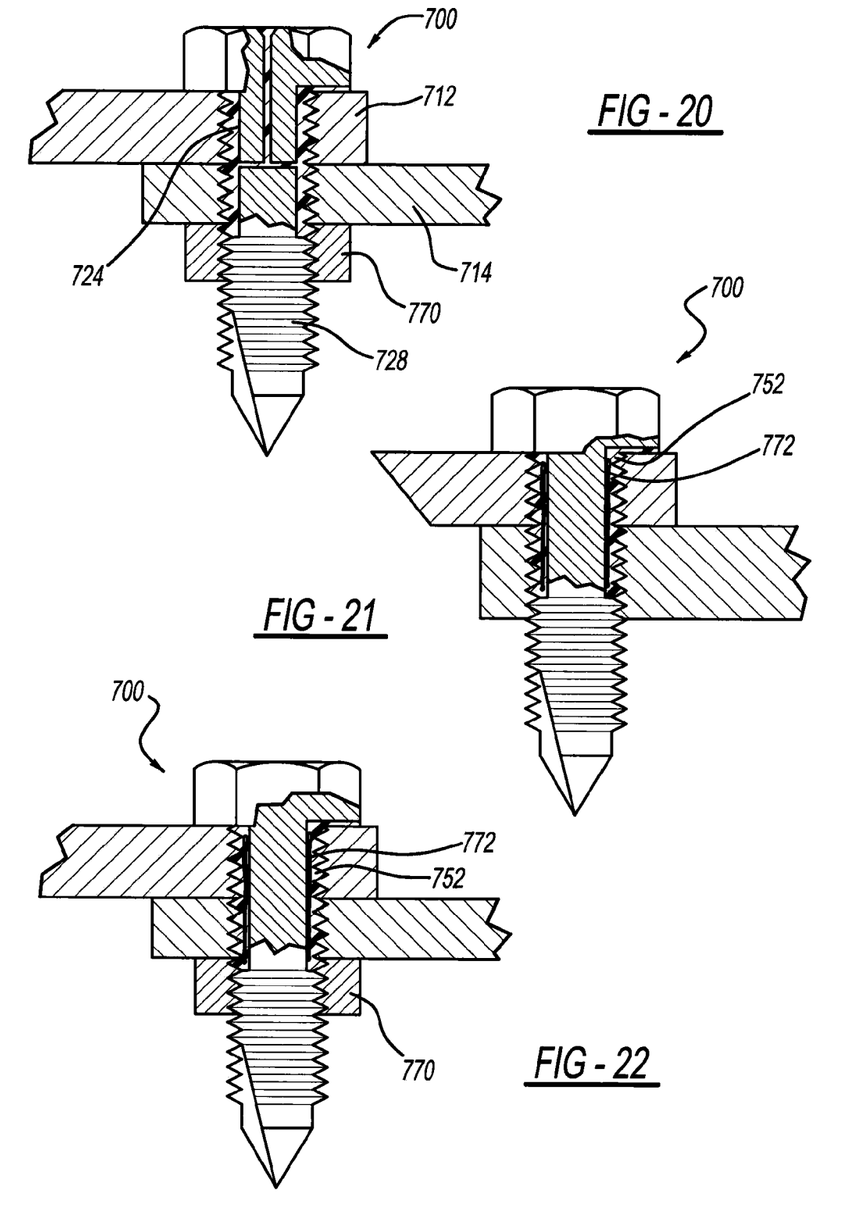
FIG. 20 is a partially fragmented, side view of an alternate configuration to the self-drilling fastener of FIG. 18.
FIG. 21 is a partially fragmented, side view of an alternate configuration to the self-drilling fastener of FIG. 18.
FIG. 22 is a partially fragmented, side view of an alternate configuration to the self-drilling fastener of FIG. 18.

Fastener 700 also incorporates a backing plate 770, as shown in FIG. 20. With the incorporation of backing plate 770, shank 724 is made longer so as to allow flute 728 to extend beyond workpieces 712, 714 and lie within backing plate 770 so as to eliminate stress concentration present at the roots of screw threads, create additional joint clamping force, and yield a greater strength.

With reference now to FIGS. 21-24, the concepts developed in the aforementioned embodiments can be applied in combination with fastener 700. For example, fastener 700 may incorporate an insert material 752 contained within a capsule 772 (FIG. 21) or incorporate both backing plate 770 and capsule 772 (FIG. 22).

Figures 23, 24, 25:
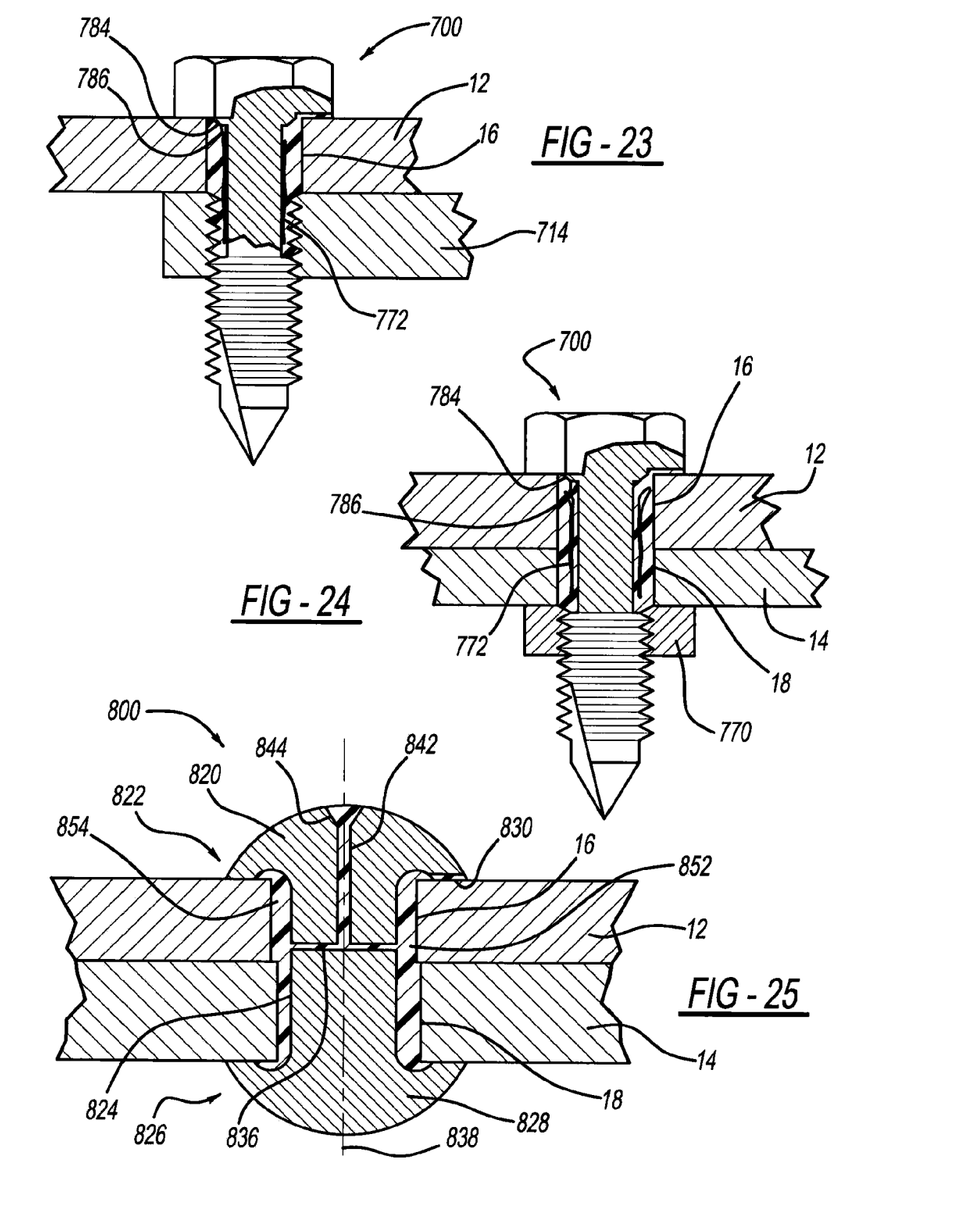
FIG. 23 is a partially fragmented, side view of an alternate configuration to the self-drilling fastener of FIG. 18.
FIG. 24 is a partially fragmented, side view of an alternate configuration to the self-drilling fastener of FIG. 18.
FIG. 25 is a partially fragmented, side view of workpieces joined by a hybrid rivet fastener according to the present invention.

Fastener 700 is also used in applications with workpieces 12, 14 having at least one pre-drilled aperture 16, 18 (FIGS. 23 and 24). In these applications, a spacer 784 is included for self-centering fastener 700 and at least one sharp projection 786 is included for assisting in cutting open capsule 772. It is contemplated that other optional features may be combined to obtain optimal results by application (e.g., "scarfed" surfaces; spacers between workpieces; sleeves).

Referring now to FIG. 25, a fastener 800 is substantially similar to that described with respect to fastener 10; however, fastener 800 is shown as a rivet. Fastener 800 is shown assembled to workpieces 12, 14 through apertures 16, 18. Fastener 800 includes a head 820 disposed at a first end 822, a shank 824 extending from head 820 between first end 822 and a second end 826, and a buck-tail 828 formed from shank 824 at second end 826 adjacent workpiece 14. An underside 830 of head 820 includes at least one slot 834 extending from shank 824 to an outer diameter of head 820. Shank 824 includes a channel 836 extending transversely to a longitudinal axis 838 of fastener 800 through the outer diameter of shank 824. A duct 842 extends from a flared portion 844 at head 820 and along longitudinal axis 838 until terminating at channel 836. Channel 836 and duct 842 may be produced by any of several different machining processes including, for example, drilling, electrical discharge machining, laser cutting or water-jet cutting.

Fastener 800 is arranged in workpieces 12, 14 and shank 824 is compressed to form buck-tail 828. An at least partially liquefied structural insert material 852 is injected through duct 842 at flared portion 844 so as to fill duct 842 and channel 836, as previously described. Insert material 852 is injected completely through duct 842 and channel 836 so as to be disposed about shank 824 within a void area 854 defined between workpieces 12, 14 and shank 824 and between head 820 and buck-tail 828. To assure complete fill of void area 854, slot 834 in head 820 is designed to allow trapped air to escape. Complete filling of void area 854 is signaled when a small amount of insert material 852 is extruded from slot 834.

It is envisioned that other styles of fasteners, not specifically described herein, may successfully utilize many of the features described herein. For example, any workpiece needing fastening may benefit from the hybrid fastener having an insert material including a suspended, solid additive as described herein. In particular, the aforementioned inserts allow a workpiece to have a rougher or increased tolerance aperture for receiving the hybrid fastener, as the insert material effectively prevents twisting stresses and fractures. As such, various machining steps may be omitted, leading to reduced production costs and timing. Accordingly, the examples and embodiments described herein are exemplary and are not intended to be limiting in describing the full scope of apparatus, systems, compositions, materials, and methods of this invention. Features of each embodiment can be interchanged with other embodiments disclosed herein. Equivalent changes, modifications, variations in specific embodiments, apparatus, systems, compositions, materials and methods may be made within the scope of the present invention with substantially similar results. Such changes, modifications or variations are not to be regarded as a departure from the spirit and scope of the invention.

The invention claimed is:

1. An apparatus comprising:
   a plurality of workpieces;
   a fastener having a shank extending through the plurality of workpieces, a head at a first end of the shank and a laterally enlarged buck-tail at an opposite second end of the shank;
   a structural insert disposed adjacent the shank and the workpieces between the head and the nut, wherein the fastener is a rivet which extends entirely through the workpieces; and
   a release agent on one of the shank and workpieces for removing one of the fastener and the insert from the workpieces.

2. The apparatus of claim 1, wherein the insert material is one of a thermosetting resin and a thermoplastic resin.

3. The apparatus of claim 1, wherein the workpieces each have an aperture with the fastener extending therethrough for securing the plurality of workpieces together, and wherein one of a magnetically, electrically, and chemically attractive coating is applied to the apertures of the workpieces for attracting one of friable and elastomeric particles in the insert.

4. The apparatus of claim 1, further comprising an electroconductive material within the insert, wherein the electroconductive material cures the insert.

5. The apparatus of claim 1, wherein:
   the shank includes a laterally elongated channel extending from one outer surface of the shank, through a solid center of the shank and to an opposite outer surface of the shank; and
   the structural insert is adapted to be injected through the channel when in a liquefied state.

6. The apparatus of claim 5, wherein:
   the head and shank include a longitudinally elongated duct extending from a central external portion of the head to the lateral channel;
   the duct having a cross-sectional dimension less than a cross-sectional dimension of the solid center of the shank laterally adjacent to either side of the duct; and
   the structural insert is adapted to be injected through the duct to the lateral channel when in a liquefied state.

7. The apparatus of claim 5, wherein:
   the head and shank include a longitudinally extending duct;
   the duct and lateral channel define a T-cross-sectional shape with the lateral channel spaced away from the head and spaced away from the buck-tail; and
   the structural insert is adapted to be injected through the duct to the lateral channel when in a liquefied state.

8. The apparatus of claim 1, wherein the head includes a laterally extending slot between an underside of a laterally enlarged flange portion thereof and an adjacent surface of the workpieces.

9. The apparatus of claim 1, wherein the rivet is a solid rivet and the buck-tail has a continuously arcuate external surface extending beyond an adjacent surface of the workpieces.

10. The apparatus of claim 1, wherein the head includes a flared entrance to a longitudinally elongated duct, the structural insert is adapted to be inserted into the flared entrance to fill the duct when in a liquefied state.

11. An apparatus comprising:
a plurality of workpieces;
a fastener having a shank extending through the plurality of workpieces, a head at a first end of the shank and a laterally enlarged buck-tail at an opposite second end of the shank;
a structural insert disposed adjacent the shank and the workpieces between the head and the nut, wherein the fastener is a rivet which extends entirely through the workpieces; and
one of a magnetically, chemically and electrically attractive coating on the shank, wherein the attractive coating attracts one of friable and elastomeric particles in the structural insert.

12. The apparatus of claim 11, wherein the head includes a laterally extending slot between an underside of a laterally enlarged flange portion thereof and an adjacent surface of the workpieces.

13. The apparatus of claim 11, wherein the rivet is a solid rivet and the buck-tail has a continuously arcuate external surface extending beyond an adjacent surface of the workpieces.

14. The apparatus of claim 11, wherein the head includes a flared entrance to a longitudinally elongated duct, the structural insert is adapted to be inserted into the flared entrance to fill the duct when in a liquefied state.

15. An apparatus comprising:
(a) an at least partially liquefied insert resin with particles being located in the resin;
(b) a solid rivet comprising:
(i) a longitudinally extending shank;
(ii) a laterally enlarged head at a first end of the shank;
(iii) a laterally enlarged buck-tail at an opposite second end of the shank;
(iv) a channel laterally extending between opposite outer sides of the shank;
(v) a duct longitudinally extending through the head and intersecting the channel; and
(vi) a flared entry to the duct, the head including at least one of: the flared entry to the duct, or a laterally extending slot, providing an air escape;
(c) the resin being injectable into the flared entry, duct and channel after the buck-tail is formed;
(d) workpieces having aligned apertures extending entirely therethrough, the rivet being located in the apertures; and
(e) a coating applied to the apertures of the workpieces, the coating magnetically, electrically or chemically attracting the particles.

16. The apparatus of claim 15, wherein:
the duct and channel define a T-cross-sectional shape with the channel being spaced away from the head and the buck-tail; and
the duct is coaxial with a longitudinal centerline of the head and the shank.

17. The apparatus of claim 15, wherein the duct has a cross-sectional dimension less than a cross-sectional dimension of a solid portion of the shank laterally adjacent to either side of the duct, and another solid portion of the shank is between the duct and the buck-tail.

18. The apparatus of claim 15, wherein the head includes the slot located between an underside of a laterally enlarged flange portion of the head and an adjacent surface of a workpiece which contacts the head.

19. The apparatus of claim 15, wherein the head includes the flared entry outwardly opening at a centerline and external point of the head, the head has an arcuate cross-sectional shape, and a narrower end of the flared entry intersecting the duct which is longitudinally elongated down a center of the shank.

20. The apparatus of claim 15, wherein:
the particles are one of: friable or elastomeric.

21. The apparatus of claim 15, wherein the particles of the resin include an electroconductive material to assist with curing the resin.

22. The apparatus of claim 15, wherein the particles of the resin include nanoparticles having a dimension of 100 nanometers or less.

23. The apparatus of claim 15, wherein the particles of the resin include chopped fibers.

24. The apparatus of claim 15, wherein the resin between each of the outer sides of the shank and an inside workpiece aperture surface is at least 2 mm thick.

25. An apparatus comprising:
(a) an insert resin comprising nanoparticles with each nanoparticle having a dimension of 100 nanometers or less, the nanoparticles being one of: (i) friable or (ii) elastomeric;
(b) a rivet comprising:
(i) a longitudinally extending shank;
(ii) a laterally enlarged head at a first end of the shank;
(iii) a laterally enlarged buck-tail at an opposite second end of the shank;
(iv) a channel laterally extending between opposite outer sides of the shank;
(v) a duct longitudinally extending through the head and intersecting the channel; and
(vi) the head including at least one of: a flared entry to the duct, or a laterally extending slot providing an air escape;
(c) the resin being injectable into the duct and channel,
(d) workpieces having aligned apertures extending entirely therethrough, the rivet being located in the apertures; and
(e) a coating applied to the apertures of the workpieces, the coating magnetically, electrically or chemically attracting the nanoparticles.

26. The apparatus of claim 25, further comprising:
a release agent on one of the shank and workpieces for removing the rivet from the workpieces.

27. The apparatus of claim 25, wherein:
the duct and channel define a T-cross-sectional shape with the channel being spaced away from the head and the buck-tail; and
the duct is coaxial with a longitudinal centerline of the head and the shank.

28. The apparatus of claim 25, wherein the duct has a cross-sectional dimension less than a cross-sectional dimension of a solid portion of the shank laterally adjacent to either side of the duct, another solid portion of the shank is between the duct and the buck-tail, and the resin is injected into the duct and channel after the buck-tail is formed.

29. The apparatus of claim 25, wherein the head includes the slot located between an underside of a laterally enlarged flange portion of the head and an adjacent surface of the workpiece which contacts the head.

30. The apparatus of claim 25, wherein the head includes the flared entry outwardly opening at a centerline and external point of the head, the head has an arcuate cross-sectional shape, and a narrower end of the flared entry intersecting the duct which is longitudinally elongated down a center of the shank.

31. The apparatus of claim 25, wherein the resin includes electroconductive material to assist with curing the resin.

32. The apparatus of claim 25, wherein the nanoparticles are graphene nanoparticles.

33. The apparatus of claim 25, wherein the nanoparticles are foliated graphite nanoplatelets.

* * * * *